United States Patent
Sprinkle

Patent Number: 5,946,769
Date of Patent: Sep. 7, 1999

[54] SELF-CONTAINED, CLOSED-LOOP, HARD SURFACE AND CARPET CLEANING APPARATUS

[76] Inventor: Richard Sprinkle, 320 W. 3rd St. #C171, Santa Rosa, Calif. 95401

[21] Appl. No.: 08/782,210

[22] Filed: Jan. 13, 1997

[51] Int. Cl.[6] .................................................. A47L 7/00
[52] U.S. Cl. ............................................ 15/321; 15/353
[58] Field of Search ............................. 15/320, 321, 353

[56] References Cited

U.S. PATENT DOCUMENTS

| | | | |
|---|---|---|---|
| 2,972,769 | 2/1961 | Keating et al. | 15/321 |
| 3,431,582 | 3/1969 | Grave | 15/321 |
| 3,605,169 | 9/1971 | Howerin et al. | 15/321 |
| 4,112,538 | 9/1978 | Bates | 15/321 |
| 4,158,248 | 6/1979 | Palmer | 15/321 |
| 4,164,055 | 8/1979 | Townsend | 15/321 |
| 4,464,810 | 8/1984 | Karpanty | 15/353 X |
| 4,696,075 | 9/1987 | Grave | 15/321 |
| 5,210,902 | 5/1993 | Lee et al. | 15/321 |
| 5,493,754 | 2/1996 | Gurstein et al. | 15/321 |

Primary Examiner—Chris K. Moore
Attorney, Agent, or Firm—Jack Lo

[57] ABSTRACT

A self-contained, closed-loop, hard surface and carpet cleaning apparatus includes a carpet cleaner with a power unit and a vacuum tank. A cleaning tool is connected to the power unit via a supply hose, and to the vacuum tank via a return hose. At the operator's business location, the vacuum tank is initially filled with a supply of fresh water passed through a water softening unit. At the job site, the water is pumped from the vacuum tank to a re-circulating tank through a series of filters. Ozone is added to the re-circulating tank to cleanse the water. The water is then passed through charcoal filters, and to the power unit. A cleaning agent is added to the water by the power unit. The water is also heated, pressurized, and delivered by the power unit to the cleaning tool via the supply hose. After the water is sprayed onto a surface being cleaned, it is immediately extracted and drawn back to the vacuum tank through the return hose. A vacuum gravity separation unit is connected along the return hose for extracting solid particles, such as sand and gravel, from the waste water before it is added back to the remaining fresh water in the vacuum tank. The waste water is thus clean enough to be reused in a close-loop.

13 Claims, 3 Drawing Sheets

SELF-CONTAINED, CLOSED-LOOP, HARD SURFACE AND CARPET CLEANING APPARATUS

BACKGROUND OF THE INVENTION

1. Field of the Invention

This invention relates generally to the cleaning of carpets and hard surfaces, indoor or outdoor.

2. Prior Art

A commercial grade "steam" carpet cleaner is typically mounted in a van. It includes a power unit and a vacuum tank. The power unit is connected to a water source at the job site with a garden hose. A cleaning agent is added to the water by the power unit. The water is also heated and pumped by the power unit to a cleaning tool via a supply hose. When the tool is stroked along a carpet, the hot water is sprayed onto the carpet. A partial vacuum is applied to the vacuum tank by the power unit, so that the water and residue are immediately extracted by the cleaning tool, and collected in the vacuum tank via a return hose. After the power unit is turned off, the waste water in the vacuum tank is dumped into a sewer system.

Such a conventional machine must be connected to a clean, pressurized water source. It uses a large amount of fresh water, and converts it into waste water. The waste water is dumped into the sewer system, which adds more volume to the already over-loaded treatment plants. It cannot be used for cleaning hard surfaces, such as parking lots, because sand and gravel will clog the vacuum tank and drain line, and there is no place to dump the waste water at such locations.

OBJECTS OF THE INVENTION

Accordingly an object of the present invention is to provide a self-contained, closed-loop, hard surface and carpet cleaning apparatus that separates contaminants picked up by the cleaning tool from the waste water, and collects them in a separation tank to prevent clogging the entire system.

Another object of the present invention is to provide a cleaning apparatus that conserves water by cleansing and recycling the waste water.

Yet another object of the present invention is to provide a cleaning apparatus eliminates the need to dump waste water.

Further objects of the present invention will become apparent from a consideration of the drawings and ensuing description.

BRIEF SUMMARY OF THE INVENTION

A self-contained, closed-loop, hard surface and carpet cleaning apparatus includes a commercial carpet cleaner, preferably mounted in a van, that includes a vacuum tank. The vacuum tank is initially filled with fresh water passed through a water softening unit that is also preferably mounted in the van. The filling operation is normally done at the operator's business location. At the job site, the water is pumped from the vacuum tank through a series of filters and into a re-circulating tank. Ozone is added to the water in the re-circulating tank to further clean and disinfect it. The water is then passed through charcoal filters, and to the power unit of the carpet cleaner. A cleaning agent is added to the water by the power unit. The water is also heated, pressurized, and sent by the power unit to a cleaning tool via a supply hose. After the water is sprayed onto a surface being cleaned, it is immediately extracted and passed through a vacuum gravity separation unit, where solid particles, such as sand and gravel, are removed from the waste water to prevent clogging the system. The filtered waste water is added back to the remaining fresh water in the vacuum tank, and the cycle is repeated.

DRAWING REFERENCE NUMERALS

10. Carpet Cleaner
11. Power Unit
12. Vacuum Tank
13. Cleaning Tool
14. Supply Hose
15. Vacuum Gravity Separation Unit
16. First Return Hose
17. Drain Pipe
18. Normally-Closed Valve
19. Pump
20. Pumps
21. 20 Micron Filters
22. 5 Micron Filters
23. Check Valves
24. Re-Circulating Tank
25. Check Valves
26. Ozone Generator
27. Pump
28. Water Softener
29. Manual Valve
30. Charcoal Filters
31. Hose
32. Check Valve
33. Housing
34. Top Cover
35. Fixed Panel
36. Slide-Out Panel
37. Fixed Panel
38. Rails
39. Cross Braces
40. Sides
41. Winding Path
42. Narrow Chamber
43. Panel
44. Front
45. Manual Valve
46. Second Return Hose
47. Hole
48. Filter
49. Rear
50. Bottom
51. Chamber
52. Pickup Tube
53. Carpet Cleaning Filter
54. Shade Cloth
55. Perforated Stainless Steel Sheets
56. Drawer
57. Opening
58. Rails
59. Cover Panel
60. Gasket
61. Drain Pipe
62. Valve
63. Intake Opening
64. Water
65. Solid Particles

DETAILED DESCRIPTION OF THE INVENTION

FIG. 1

Figure 1:
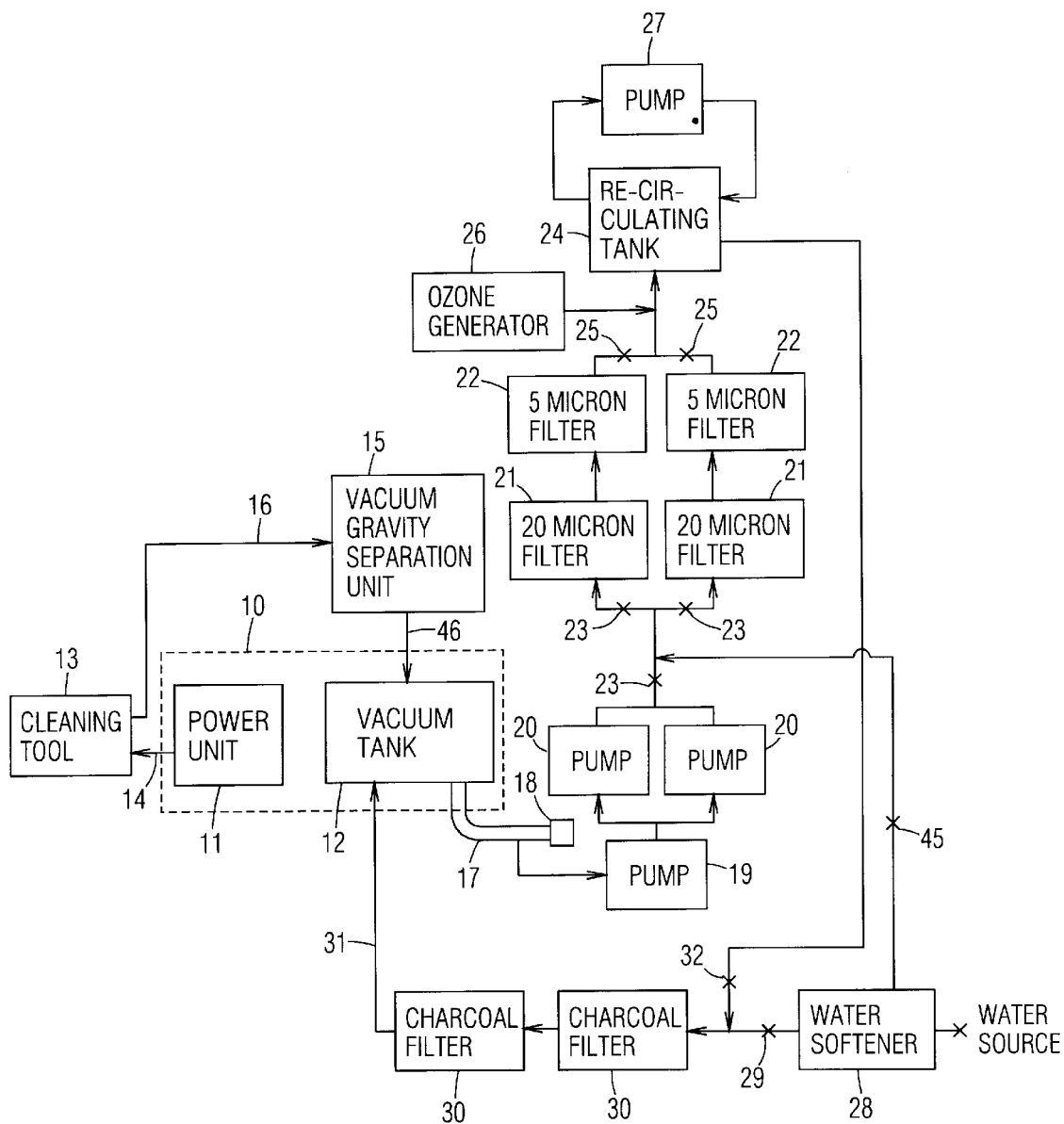
FIG. 1 is a block diagram of a self-contained, closed-loop, hard surface and carpet cleaning apparatus when arranged for filling.

In accordance with a preferred embodiment of the invention shown in the block diagram in FIG. 1, a self-contained, closed-loop, hard surface and carpet cleaning apparatus includes a conventional carpet cleaner 10, such as the one sold under the trademark "POWERMATIC PLATINUM 2001" by Steamway International Inc. of Denver, Colo. Carpet cleaner 10 includes a power unit 11 and a vacuum tank 12. A conventional portable cleaning tool 13 is connected to power unit 11 by a supply hose 14, and is also connected to a vacuum gravity separation unit 15 (discussed in detail in conjunction with FIG. 3) by a first return hose 16. Vacuum gravity separation unit 15 is connected to vacuum tank 12 by a second return hose 46.

A drain pipe 17 extends from vacuum tank 12, and includes a normally-closed valve 18 at its distal end. Pipe 17 is connected to a pump 19 at a point upstream of valve 18. Pump 19 is supplemented by two parallel pumps 20, the outputs of which are connected to a pair of 20-micron filters 21 and a pair of 5-micron filters 22. Check valves 23 connected between pumps 20 and filters 21 prevent backflow. 5-micron filters 22 are connected to a re-circulating tank 24, preferably of about 159 liters (42 gallons). A pair of check valves 25 are connected between filters 22 and re-circulating tank 24. A conventional ozone generator 26 is connected to re-circulating tank 24 after check valves 25. A pump 27 is connected in a loop to re-circulating tank 24.

Vacuum tank 12 is initially filled with fresh water, i.e., a cleaning fluid, preferably from a source at the operator's business location, so that the cleaning apparatus can be used anywhere, even at job sites without a water supply. The water is softened by a conventional water softener 28, passed through a manual valve 29, which is opened for the filling operation, and a series of two charcoal filters 30. The water is directed via a hose 31 into vacuum tank 12 through an opening (not shown) thereon, which is closed after the filling operation. Manual valve 29 is also closed after the filling operation. Re-circulating tank 24 is connected to the first charcoal filter 30 through a check valve 32. Water softener 28 is also connected to filters 21 through a manual valve 45, which is normally closed when the cleaning apparatus is being operated in a closed-loop.

FIG. 2

Figure 2:
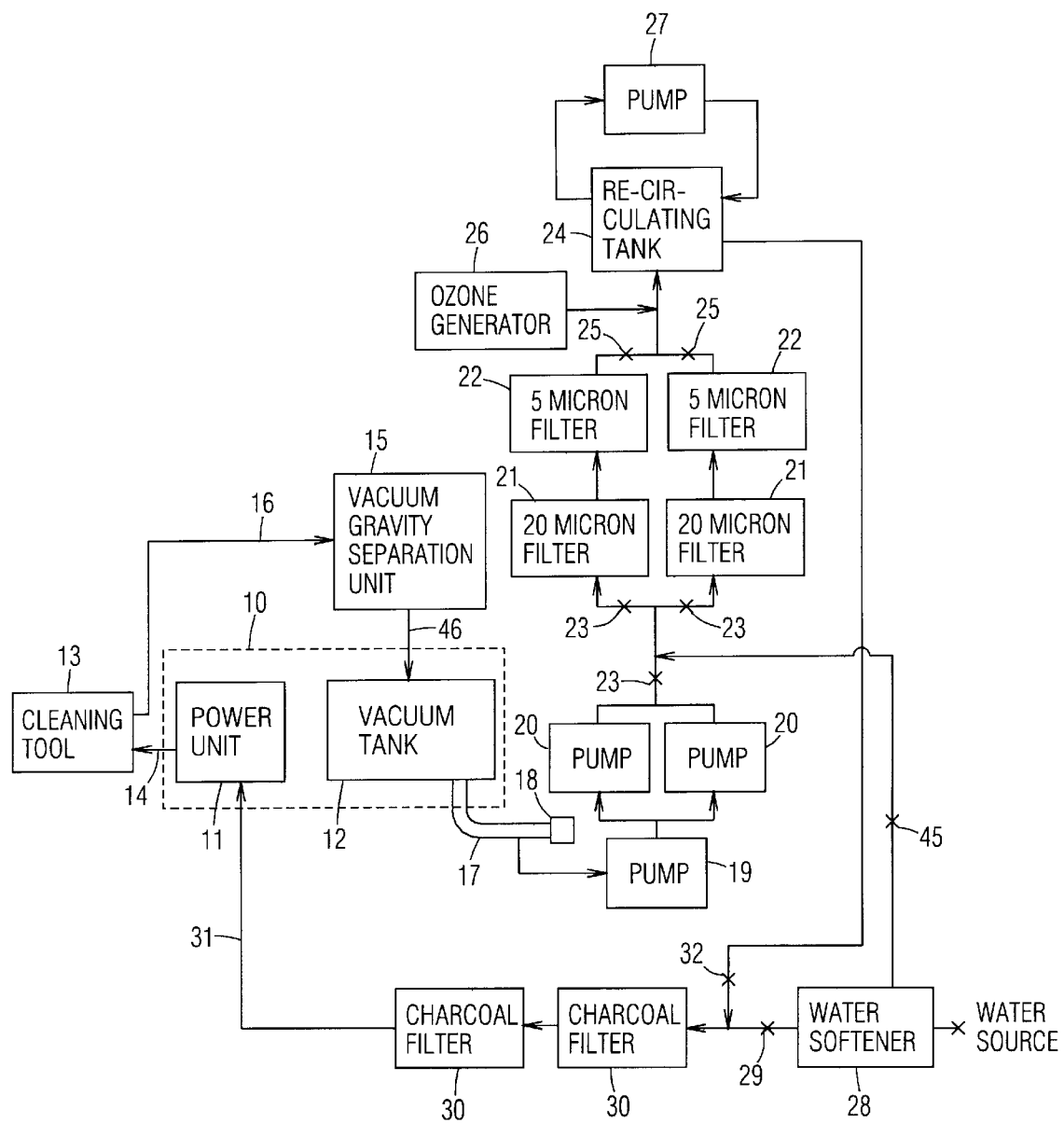
FIG. 2 is a block diagram of the cleaning apparatus when arranged for cleaning.

When the ground cleaning apparatus is transported to a job site, preferably by being mounted in a van (not shown), hose 31 is connected to power unit 11, as shown in FIG. 2. Power unit 11, ozone generator 26, and pumps 19, 20, and 27 are activated to begin cleaning. The water from charcoal filters 30 is pressurized, heated, and mixed with a cleaning agent by power unit 11. The water is fed to cleaning tool 13, and sprayed onto the surface to be cleaned, such as a carpet or outdoor pavement. The water is immediately drawn back into cleaning tool 13 by the suction generated in vacuum tank 12 by power unit 11 (connection between tank 12 and power unit 11 not shown). Solid particles larger than about 30 microns, such as sand and gravel, are removed by vacuum gravity separation unit 15 to prevent clogging vacuum tank 12. In addition to indoor carpets, the cleaning apparatus can thus be used to clean a variety of hard surfaces, including outdoor surfaces littered with sand and gravel.

The waste water, i.e., dirty water, is mixed with the clean water in vacuum tank 12. The mixed water is drawn from drain pipe 17 by pumps 19 and 20, and pumped through filters 21 and 22, which further filter the water to remove solid particles larger than about 5 microns. Ozone is injected into the water leaving the filters by ozone generator 26. The water is fed into re-circulating tank 24, where it is re-circulated by pump 27 to thoroughly mix the water with the ozone, which cleans and disinfects the water. Re-circulating tank 24 also serves as a holding tank for supplying power unit 11 with thoroughly cleansed water through check valve 32 and charcoal filters 30, so the cycle is repeated. Water is thus conserved by recycling the same internal supply over and over again.

Alternatively, if a water source is available at a job site, valve 45 may be opened and valve 29 closed to operate with the customer's water, so that the waste water in vacuum tank 12 is dumped after use instead of being recycled. Although many local governing agencies prohibit the dumping of contaminated water in the sewer system, the waste water is cleaned by vacuum gravity separation unit 15, filters 21, 22, and 30, and ozone generator 26, so that it is clean enough for dumping. Also, valve 45 may be opened and valve 29 may be closed to ozonize freshly introduced water more quickly, for example, when the apparatus is being replenished to make up for losses during cleaning.

FIG. 3

Figure 3:
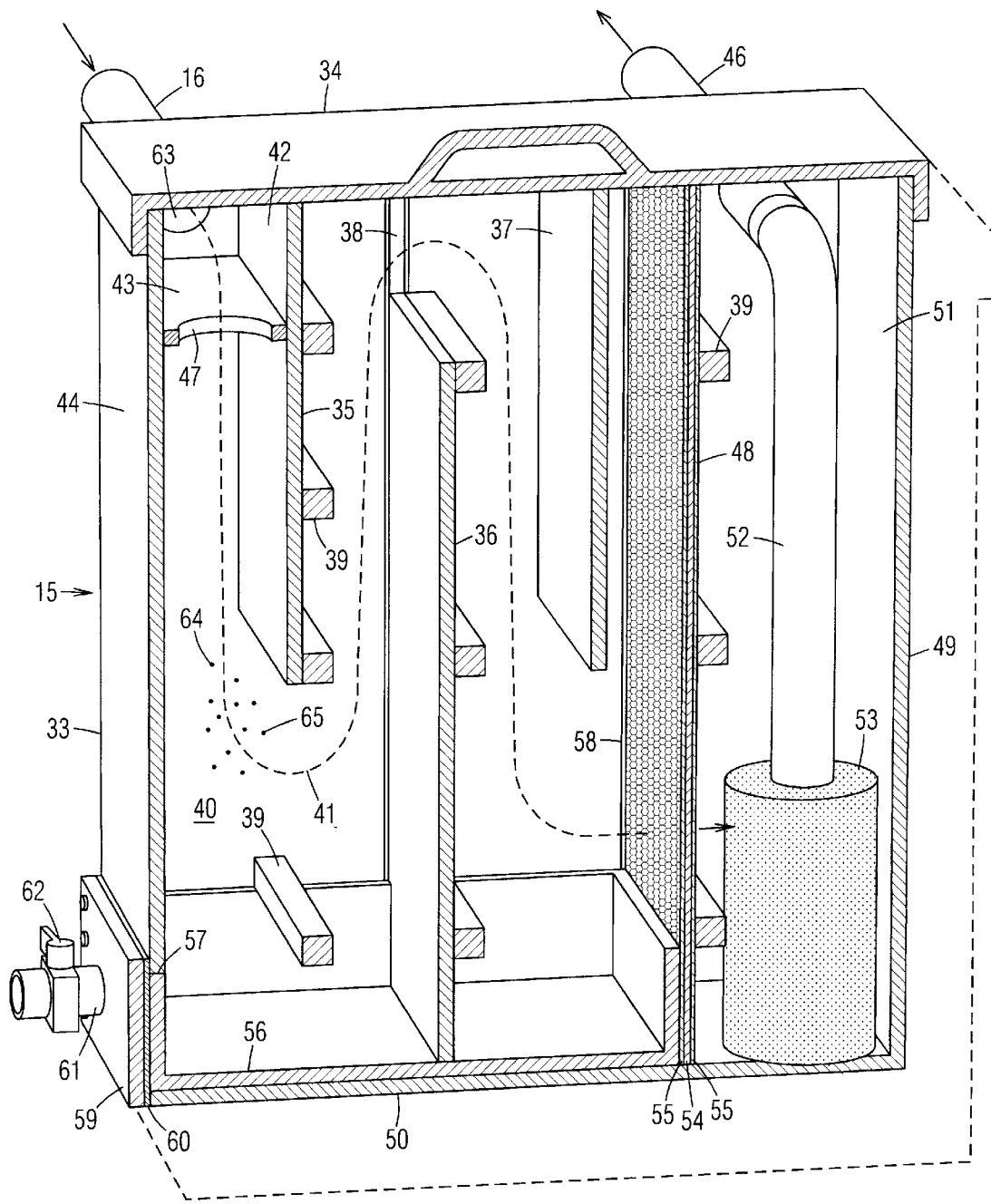
FIG. 3 is a side cutaway view of a vacuum gravity separation unit of the cleaning apparatus.

As shown in the side cutaway view in FIG. 3, vacuum gravity separation unit 15 includes a housing 33 with a removable, air-tight top cover 34. A winding path 41, indicated by the dashed line, is defined by spaced apart, vertically offset panels 35–37 that extend between opposite sides 40 (one shown) of housing 33. Panels 35 and 37 extend from the lower side of top cover 34 partially down toward a bottom 50 of housing 33. Panel 36 extend from the bottom of housing 33 almost to the lower side of top cover 34. Panel 36 is slidable between a pair of rails 38 (one shown) on the sides of housing 33. Fixed cross braces 39 extend between sides 40 of housing 33 for added strength to withstand the vacuum. A narrow horizontal chamber 42 is defined by a horizontal partition 43 extending between sides 40, and between a front 44 of housing 33 and panel 35. Return hose 16 from cleaning tool 13 (FIG. 1) is connected to an intake opening 63 at the top of side 40. Housing 33 is much wider than return hose 16 and intake opening 63. A hole 47 is arranged on partition 43.

A planar filter 48 is positioned between panel 37 and a rear side 49 of housing 33. Filter 48 extends between sides 40, and between top 34 and bottom 50, so as to define a closed chamber 51. Filter 48 is slidably positioned between a pair of rails 58 (one shown) on sides 40. Filter 48 includes a shade cloth center 54 sandwiched between two perforated stainless steel sheets 55. A conventional carpet cleaning filter 53 is positioned at the bottom of chamber 51, and attached to the lower end of an exit or pickup tube 52, the top end of which is attached to side 40 of housing 33, and connected to vacuum tank 12 (FIG. 1) via connecting hose 46. A drawer 56 positioned on the bottom of housing 33 is slidably removable therefrom via an opening 57 at the lower end of front 44. A cover panel 59 is bolted to front 44 to retain drawer 56. A seal between drawer 56 and opening 57 is provided by a gasket 60. A drain pipe 61 is communicably connected to drawer 56 at its front side, and positioned through cover panel 59 and gasket 60. A valve 62 is threaded onto the outer end of drain pipe 61.

In the narrow space of return hose 16, the moving stream of air and waste water is fast enough to carry along solid particles, such as sand and gravel. The fast moving stream enters small chamber 42 through intake opening 63. When it exits hole 47, it expands into the enlarged space of housing 33, so that the water droplets 64 are vaporized into a fine mist, and the velocity of the stream is significantly reduced. The stream is slowed to a level that is too low to carry along heavy solid particles 65, which drop onto drawer 56. The up-and-down or vertical winding path 41 defined by panels 35–37 include 180 degree vertical turns that further facilitate the separation of the solid particles from the stream of air and mist. Most of the solids are collected in drawer 56 in front of panel 36. Filter 48 screens the moving stream to further block the passage of particles larger than about 30 microns. The remaining particles are collected in drawer 56 behind panel 36. After passing through filter 48, the stream of air and mist is further filtered by conventional carpet cleaning filter 53 at the base of pickup tube 52, and then carried to vacuum tank 12 (FIG. 1). Solid particles that would otherwise clog the vacuum tank are thus thoroughly removed from the stream. Therefore, the present cleaning apparatus can be used to clean all types of surfaces in addition to carpets, including hard outdoor surfaces littered with sand and gravel.

After use, vacuum gravity separation unit 15 is cleaned by removing top cover 34, sliding out panel 36 and filter 48, unbolting cover panel 59, and sliding out drawer 56 to empty it. The filters can be cleaned or replaced. Alternatively, instead of disassembling vacuum gravity separation unit 15, drawer 56 can be mostly emptied by opening valve 62, and tilting the unit to pour out the residue.

SUMMARY AND SCOPE

Accordingly, I have provided a self-contained, closed-loop, hard surface and carpet cleaning apparatus that can be used at a variety of locations, even those without a source of water. It conserves water by re-circulating a built-in supply. It can also clean a variety of other surfaces in addition to carpets, including outdoor surfaces, without becoming clogged by sand and gravel. Although the above descriptions are specific, they should not be considered as limitations on the scope of the invention, but only as examples of the embodiments. Many substitutes and variations are possible within the teachings of the invention. For example, carpet cleaner 10 may be substituted with other types of carpet cleaners. Vacuum gravity separation unit 15 may be used with a conventional open, i.e., non-closed-loop, system for filtering out large particles, such as sand and gravel, before dumping the waster water into a sewer system. Vacuum gravity separation unit 15 may also be used with other types of devices for extracting solid particles from a stream of fluid. The partitions in housing 33 may be eliminated, so that the solids are separated by the expansion, vaporization, and slowing of the fluid stream as it enters the enlarged chamber. The water softener, the ozone generator, and the filters may be individually or altogether eliminated. Therefore, the scope of the invention should be determined by the appended claims and their legal equivalents, not by the examples given.

I claim:

1. a closed-loop surface cleaning apparatus, comprising:
a cleaning tool adapted for applying a cleaning fluid to a surface being cleaned:
a power unit connected to said cleaning tool via a supply hose;
a vacuum tank connected to said cleaning tool via a return hose, said vacuum tank being adapted for holding a supply of said cleaning fluid, said power unit being adapted for delivering said cleaning fluid from said vacuum tank to said cleaning tool, a vacuum in said vacuum tank being generated by said power unit for applying suction through said return hose and said cleaning tool for extracting said cleaning fluid from said surface; and a vacuum gravity separation means connected along said return hose between said cleaning tool and said vacuum tank for substantially separating any solid particles from said cleaning fluid before said cleaning fluid is returned to said vacuum tank, said cleaning apparatus being adapted for repeatedly circulating said cleaning fluid in a closed-loop from said vacuum tank to said power unit, from said power unit to said cleaning tool, from said cleaning tool to said vacuum gravity separation means, and from said vacuum gravity separation means back to said vacuum tank, so that said cleaning fluid is free enough of said solid particles for being reused without clogging said vacuum tank and said power unit, said vacuum gravity separation means comprises a housing substantially wider than said return hose, said return hose being adapted for directing a stream comprising of said cleaning fluid, air, and said solid particles into said housing, said stream expanding and slowing substantially when entering said housing, so that said cleaning fluid is substantially vaporized, said stream slowing to a level too low to carry aloft said solid particles, so that said solid particles substantially fall to a bottom of said housing for being collected thereon, and only said cleaning fluid and said air are passed through said housing, and a drawer slidably positioned at said bottom of said housing, said drawer being adapted for collecting said solid particles, said drawer being slidable outwardly from said housing for disposing said solid particles.

2. a closed-loop surface cleaning apparatus, comprising:
a cleaning tool adapted for applying a cleaning fluid to a surface being cleaned;
a power unit connected to said cleaning tool via a supply hose;
a vacuum tank connected to said cleaning tool via a return hose, said vacuum tank being adapted for holding a supply of said cleaning fluid, said power unit being adapted for delivering said cleaning fluid from said vacuum tank to said cleaning tool, a vacuum in said vacuum tank being generated by said power unit for applying suction through said return hose and said cleaning tool for extracting said cleaning fluid from said surface; and a vacuum cavity separation means connected along said return hose between said cleaning tool and said vacuum tank for substantially separating any solid particles from said cleaning fluid before said cleaning fluid is returned to said vacuum tank, said cleaning apparatus being adapted for repeatedly circulating said cleaning fluid in a closed-loop from said vacuum tank to said power unit, from said power unit to said cleaning tool, from said cleaning tool to said vacuum gravity separation means, and from said vacuum gravity separation means back to said vacuum tank, so that said cleaning fluid is free enough of said solid particles for being reused without clogging said vacuum tank and said power unit, said vacuum gravity separation means comprises a housing substantially wider than said return hose, said return hose being adapted for directing a stream comprising of said cleaning fluid, air, and said solid particles into said housing, said stream expanding and slowing substantially when entering said housing, so that said cleaning fluid is substantially vaporized, said stream slowing to a level too low to carry aloft said solid particles, so that said solid particles substantially fall to a bottom of said housing for being collected thereon, and only said cleaning fluid and said air are passed through said housing; and a predetermined winding path defined in said housing for said stream, said winding path including a plurality of sections with a substantial change in direction therebetween for enhancing separation of said solid particles from said cleaning fluid and said air.

3. The closed-loop surface cleaning apparatus of claim 2, further including an exit arranged on said housing, and a filter positioned between said winding path and said exit.

4. The closed-loop surface cleaning apparatus of claim 2, wherein adjacent sections of said winding path are positioned in generally opposite directions.

5. The closed-loop surface cleaning apparatus of claim 2, wherein said winding path is defined by a plurality of horizontally spaced part, vertically offset vertical partitions extending between a pair of opposite interior sides of said housing.

6. A closed-loop surface cleaning apparatus, comprising:

a cleaning tool adapted for applying a cleaning fluid to a surface being cleaned;

a power unit connected to said cleaning tool via a supply hose;

a vacuum tank connected to said cleaning tool via a return hose, said vacuum tank being adapted for holding a supply of said cleaning fluid, a vacuum in said vacuum tank being generated by said power unit for applying suction through said return hose and said cleaning tool for extracting said cleaning fluid from said surface;

a vacuum gravity separation means connected along said return hose between said cleaning tool and said vacuum tank for substantially separating any solid particles from said cleaning fluid before said cleaning fluid is returned to said vacuum tank;

a re-circulating tank connected between said vacuum tank and said power unit;

pumping means for delivering said cleaning fluid from said vacuum tank to said re-circulating tank; and an ozone generator connected to said re-circulating tank and adapted for ozonizing and thus further cleansing said cleaning fluid, said power unit being adapted for delivering said cleaning fluid from said re-circulating tank to said cleaning tool, said cleaning apparatus being adapted for repeatedly circulating said cleaning fluid from said vacuum tank to said re-circulating tank, from said re-circulating tank to said power unit, from said power unit to said cleaning tool, from said cleaning tool to said vacuum gravity separation means, and from said vacuum gravity separation means back to said vacuum tank, so that said cleaning fluid is free enough of said solid particles for being reused without clogging said vacuum tank and said power unit.

7. The closed-loop surface cleaning apparatus of claim 6, further including a filter connected between said vacuum tank and said re-circulating tank.

8. The closed-loop surface cleaning apparatus of claim 6, wherein said vacuum gravity separation means comprises a housing substantially wider than said return hose, said return hose being adapted for directing a stream comprising of said cleaning fluid, air, and said solid particles into said housing, said stream expanding and slowing substantially when entering said housing, so that said cleaning fluid is substantially vaporized, said stream slowing to a level too low to carry aloft said solid particles, so that said solid particles substantially fall to a bottom of said housing for being collected thereon, and only said cleaning fluid and said air are passed through said housing.

9. The closed-loop surface cleaning apparatus of claim 8, further including a drawer slidably positioned at said bottom of said housing, said drawer being adapted for collecting said solid particles, said drawer being slidable outwardly from said housing for disposing said solid particles.

10. The closed-loop surface cleaning apparatus of claim 8, further including a predetermined winding path defined in said housing for said stream, said winding path including a plurality of sections with a substantial change in direction therebetween for enhancing separation of said solid particles from said cleaning fluid and said air.

11. The closed-loop surface cleaning apparatus of claim 10, further including an exit arranged on said housing, and a filter positioned between said winding path and said exit.

12. The closed-loop surface cleaning apparatus of claim 10, wherein adjacent sections of said winding path are positioned in generally opposite directions.

13. The closed-loop surface cleaning apparatus of claim 10, wherein said winding path is defined by a plurality of horizontally spaced part, vertically offset vertical partitions extending between a pair of opposite interior sides of said housing.

* * * * *